July 14, 1931.  A. M. BARRETT  1,814,110
PORTABLE ELEVATOR
Filed Jan. 22, 1926  2 Sheets-Sheet 1
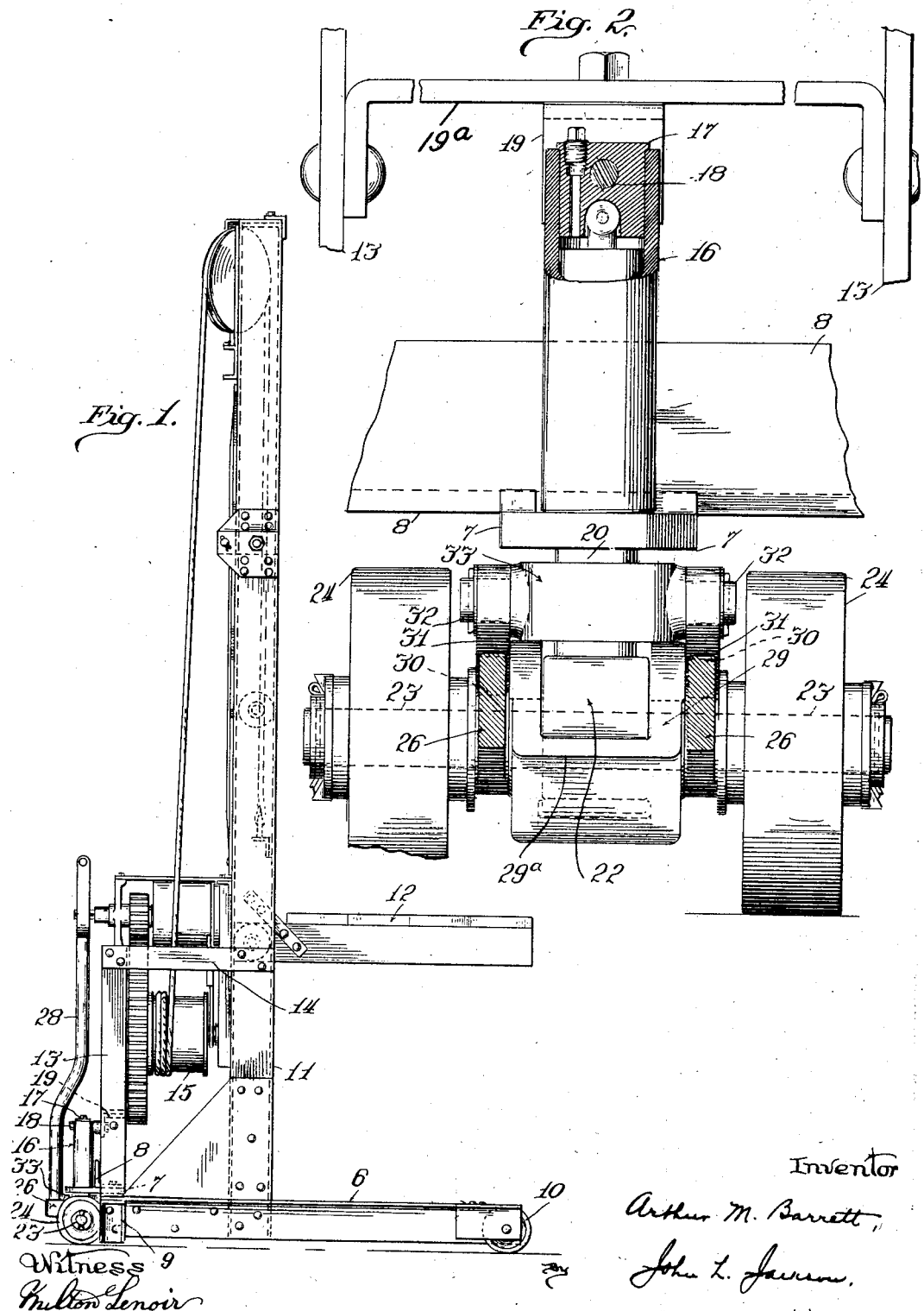

July 14, 1931.  A. M. BARRETT  1,814,110
PORTABLE ELEVATOR
Filed Jan. 22, 1926   2 Sheets-Sheet 2
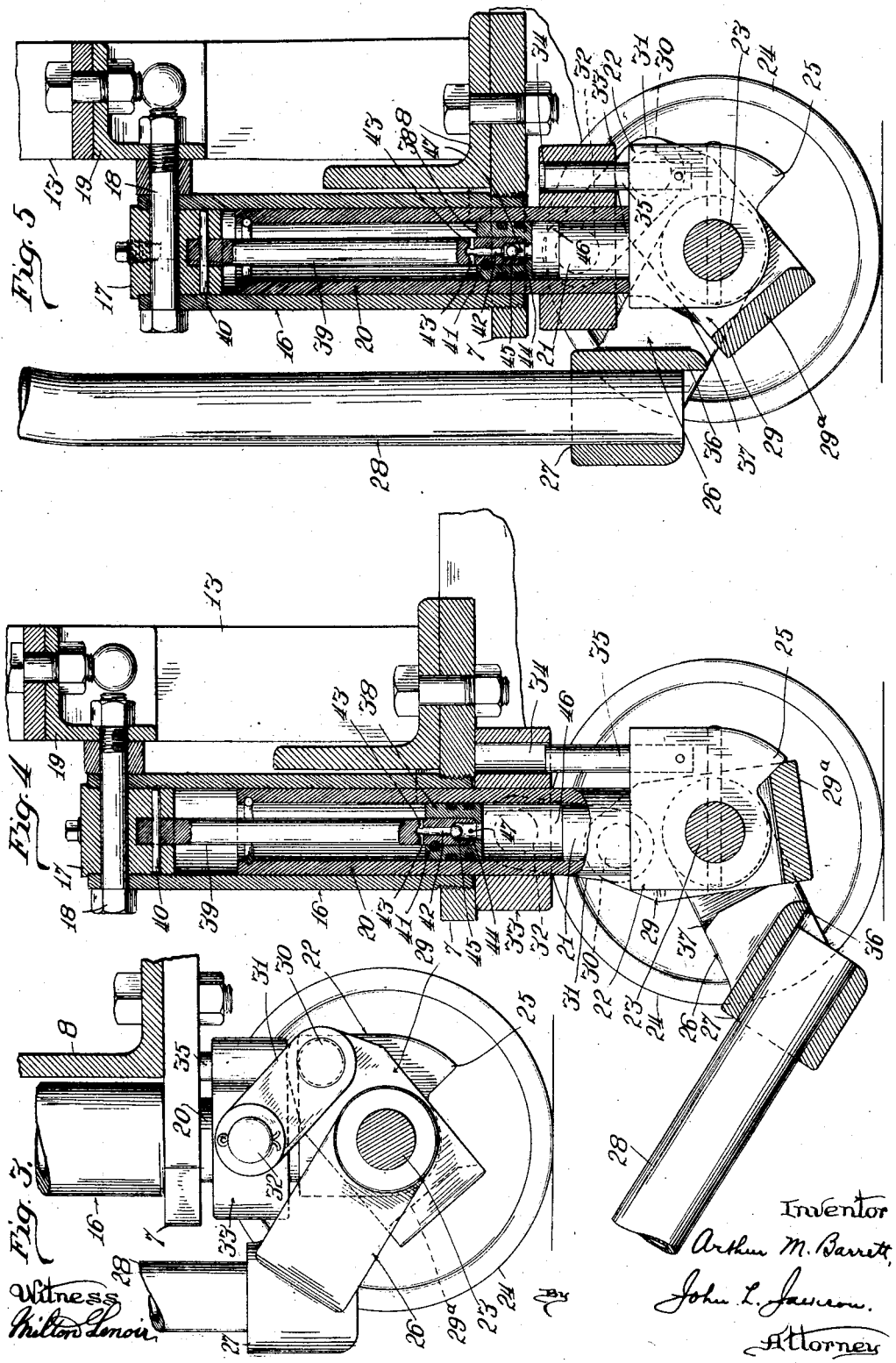

Patented July 14, 1931

1,814,110

UNITED STATES PATENT OFFICE

ARTHUR M. BARRETT, OF WINNETKA, ILLINOIS, ASSIGNOR TO BARRETT-CRAVENS COMPANY, OF CHICAGO, ILLINOIS, A CORPORATION OF ILLINOIS

PORTABLE ELEVATOR

Application filed January 22, 1926. Serial No. 82,919.

My invention relates to portable elevators or tiering machines comprising a base mounted at its ends on wheels, the wheels at one end being dirigible so that the machine may be steered, the base being arranged to support standards on which a platform is movable vertically by the operation of hoisting mechanism also carried by the base. In such machines it is common to arrange the steering wheel or wheels so that they may be moved vertically with respect to the base to allow its adjacent end to rest on the floor while the steering wheels are elevated to an inoperative position, thereby making the base temporarily stationary. Usually standards are provided adjacent to the steering wheels, on which the base rests when the steering wheels are elevated out of operative position. A machine of this general type is shown and described in Letters Patent No. 1,504,415, granted to me August 12, 1924, on the application of myself and Frank L. Eidmann.

The object of my present invention is to provide certain improvements in portable elevators of the type referred to by which the lowering of the base into stationary engagement with the floor will be automatically checked so that it will be lowered easily and smoothly; also to provide improved means for mounting the steering wheels, and improved lifting devices for effecting their vertical movement with respect to the base. I accomplish these objects as illustrated in the drawings and hereinafter described. What I regard as new is set forth in the claims.

In the accompanying drawings,—

Fig. 1 is a side elevation of a portable elevator embodying my improvements;

Fig. 2 is an end view, partly in section, showing the steering wheels and parts of the base and other framework of the machine;

Fig. 3 is a partial side elevation illustrating the elevating devices;

Fig. 4 is a partial longitudinal vertical section showing the mounting of the steering wheels and the arrangement of the checking devices which eases the descent of the load, the parts there being shown with the steering wheels in operative position; and Fig. 5 is a similar view showing the position of the parts when the steering wheels are raised out of operative position and the adjacent end of the base has stationary engagement with the floor or ground.

Referring first to Fig. 1, it will be seen that the machine as a whole comprises a base 6 which is preferably somewhat U-shaped and is composed of two parallel angle bars cross-connected at one end in any suitable way so as to make a rigid structure. In the illustration said side members are cross-connected by an angle iron 8 fixedly secured thereto, to the central portion of which angle iron a plate 7 is firmly secured, as best shown in Figs. 4 and 5. At their connected ends the side members 6 are provided with short vertical standards 9 the lower ends of which are adapted to engage the floor or ground when it is desired to hold the machine stationary. When, however, that end of the machine is raised on the steering wheels, as hereinafter described, the base is wholly supported on wheels as will presently appear, and may then be readily transported from place to place. The opposite or disconnected ends of the side members 6 are provided with supporting wheels 10 mounted in any suitable way.

Rising from the side members 6 are standards 11 which form guides for a vertically movable platform 12 adapted to support the load to be elevated, said platform being movable downward to lie between the side members 6 of the base so that its upper surface is then substantially flush with the upper surfaces of said side members, a facilitate placing the load on it. Also mounted on the base, and in a position adjacent to the steering wheels, are standards 13, the upper end portions of which are connected with the standards 11 by cross-bars 14, forming a frame which supports a hoisting drum 15, by the operation of which the platform 12 is raised or lowered. As the construction and operation of the hoisting mechanism has nothing to do with my present invention it is thought to be unnecessary to describe it further.

Referring now to Figs. 4 and 5, it will be seen that the plate 7 carries a vertical cylinder 16 arranged adjacent to the upper flange of the angle iron 8 and located midway between the side members 6 of the base. Said cylinder is preferably screw threaded at its lower end and is screwed into a suitable opening in the plate 7 as shown. The upper end of the cylinder 16 is tightly closed by a plug 17 suitably secured in place, as by a bolt 18 that extends horizontally through it and through the web of an angle bracket 19 suitably supported by the standards 13, preferably by means of a cross bar 19ª, as shown in Fig. 2. I thus provide a vertical cylinder carried by the base and open at its lower end while closed at its upper end.

Arranged to move telescopically and to rotate in the cylinder 16 is an inner cylinder 20 open at its upper end. The inner cylinder 20 extends down below the lower end of the outer cylinder 16 and fits tightly upon a vertical stud 21 that closes its lower end. Said stud rises from a steering head 22 mounted upon an axle 23 carrying two steering wheels 24, as best shown in Fig. 2. Both cylinders 16 and 20 are coaxial with the steering axis of the axle 23 and the cylinder 20, being secured to the steering head 22, acts as a steering post which is journaled within the cylinder secured to the standards 13 on the base 6. The head 22 is provided with a shoulder 25 at its under side, as best shown in Figs. 4 and 5, the purpose of which will be hereinafter set forth.

Pivoted on the axle 23 is a yoke 26 having a socket 27 to receive a handle 28 by which said yoke may be rocked upon the axle. Also mounted on the axle 23 between the head 22 and the arms of the yoke 26 are toggle members 29 connected at their lower ends by a cross-member 29ª to form an inverted yoke having its free ends extending up above the axle 23, as best shown in Fig. 2. The upper ends of the toggle members 29 are connected by pivots 30 with toggle links 31 which are connected by studs 32 with opposite sides of a collar 33 that fits on the cylinder 20 below the plate 7. The collar 33 is slidable longitudinally of said cylinder to permit vertical movement of the steering wheels with respect to the base, as illustrated in Figs. 4 and 5. The arrangement is such that by actuating the toggle mechanism the collar 33 may be moved up into engagement with the plate 7, thereby moving the steering wheels away from said plate in a downward direction, as is the case when said wheels are to be moved to operative position, as shown in Fig. 4, or said collar may be moved downward toward the head 22 to permit the proximate end of the base to be lowered with respect to the steering wheels, as is the case when the standards 9 are to be permitted to engage the ground, and the steering wheels are to be raised out of operative position. The collar 33 is provided with a vertical passage 34 into the lower end of which a pin 35 carried by the head 22 projects to a greater or less extent, depending upon the position of the collar 33, as illustrated in Figs. 4 and 5. The function of the pin 35 is to cause the collar 33 to rotate with the head 22 when said head is turned laterally in steering the steering wheels, and thereby prevent the application of twisting strains to the toggle mechanism. The arrangement of the toggle mechanism is such that when the steering wheels are out of operative position, at which time the handle 28 is upright, as shown in Fig. 5, the toggle members 29, 31 will stand at a pronounced angle to each other, as indicated by dotted lines in Fig. 5. By swinging the toggle members 29 counterclockwise as viewed in Figs. 4 and 5 the toggle members 29, 31 may be brought into alinement with each other and with the axle 23, thereby moving said axle away from the collar 33, or in other words moving said collar upward relatively to the axle. Furthermore, by continuing this movement so that the pivots 30 pass center the parts may be locked in the position shown in Fig. 4. The toggle members 29 may be swung counterclockwise by swinging the upper end of the handle 28 downward from the position shown in Fig. 5, since the sleeve 27 is provided with a shoulder 36 that is adapted to engage the cross-member 29ª so that after such engagement occurs further downward movement of the handle 28 will swing the toggle members 29 in the manner described. This movement will continue until the member 29ª strikes the shoulder 25 on the head 22, as shown in Fig. 4, which occurs after the pivots 30 have passed center slightly. Consequently the parts will then retain such position with the steering wheels in operative engagement with the ground. To break the toggle so that the steering wheels may move upward out of operative position the handle 28 is swung in the opposite direction, whereupon a shoulder 37 on the yoke 26 will engage one of the toggle members 29 so that further movement of the handle 28 in a clockwise direction will rock said toggle member in a like direction until, as soon as the pivots 30 cross the center line, the weight of the elevator frame will cause the toggle members to continue their movement until the standards 9 come in contact with the floor.

The checking of the descent of the frame is effected by means of a piston 38 fitted to operate in the cylinder 20 and connected by a piston rod 39 with the plug 17. The upper end of the piston rod 39 is connected with said plug by a pivot 40, as best shown in Fig. 2, and its lower end extends into the piston 38, with which it is connected by a key 41 shown in Fig. 4. A vertical duct 42 is provided in the lower end of the piston rod 39 and communicates with the interior of the cylinder above the piston by one or more passages 43. The lower end of the duct 42 is enlarged to form a chamber 44 the upper end of which forms a valve seat for a ball valve 45. Thus the valve 45 serves to prevent free upward flow of liquid through the duct 42 from the lower to the upper side of the piston 38, but permits downflow of liquid from that portion of the cylinder 20 above the piston to a chamber 46 formed between the piston and the upper end of the stud 21. It will be understood that the size of the chamber 46 varies as the position of the piston in the cylinder 20 changes. A cross-pin 47 serves to prevent the ball valve 45 from dropping out of the chamber 44.

A quantity of oil or other suitable liquid is placed in the cylinder 20 and will flow down through the duct 42 into the chamber 46 until such chamber is filled. Assuming that the parts are in the position shown in Fig. 5, at which time the standards 9 are resting on the ground and the handle 28 is in its upright position, when it is desired to transport the elevator the handle is swung downward, thereby by the action of the toggle mechanism lifting the standards from the ground and supporting the base on the steering wheels as well as on the supporting wheels 10. As this action occurs the piston 38, being connected with the base through the framework of the elevator, is drawn up in the cylinder 20 enlarging the chamber 46 in the manner illustrated in Fig. 4 and permitting a greater quantity of oil to pass down through the duct 42 into said chamber. The condition shown in Fig. 4 will obtain as long as the elevator is arranged for transport, and obviously the steering wheels 24 may be guided by means of the handle without affecting the toggle mechanism, so that there is no danger that the locking position of the toggle mechanism will be disturbed. When it is desired to lower the base to move the standards 9 into engagement with the ground the handle 28 is swung upward to break the toggle lock, whereupon the steering wheel end of the base, with the piston 33, will move downward. Such downward movement will, however, be resisted by the liquid in the chamber 26 since the valve 43 will prevent the free flow of the liquid upward through the duct 42. Enough oil will, however, leak by the piston rings or around the valve so that the piston will descend slowly. The hydraulic mechanism, therefore, cushions the descent of that end of the base so that the standards 9 engage the ground without shock. As the cylinder 20 is firmly secured to the head 22 it turns with said head about the steering axis of the steering wheels, as does also the collar 33. Consequently steering the truck does not disturb the toggle mechanism. The piston 38 does not turn with the cylinder 20 as it is held against turning by the stationary cylinder 16 mounted on the base.

From the foregoing description it will be seen that I have provided a hydraulic check comprising elements, in the form of the outer cylinder 16 and the inner cylinder 20, supported respectively by the base and the steering head, and arranged coaxially with the steering axis of the steering head, and that said check operates to cushion the descent of the steering head end of the base, with the parts supported on it, when the elevator is changed from transport to its stationary or loading and unloading position. Also that I provide in connection with such check toggle mechanism for moving the steering head and base vertically relatively to each other and for locking the steering wheel end of the base in its elevated or transport position. As the steering handle and toggle mechanism are pivotally mounted independently of each other upon the steering wheel axle 23, the steering handle may be swung vertically through a limited range without affecting the toggle mechanism. This range is increased by movement of the toggle mechanism into position to hold the base in its lifted position, in which position it becomes automatically locked as described. Such lock may, however, be released by upward swinging of the handle beyond a certain point, as has been explained. By this arrangement the handle may be swung up or down through a considerable arc, particularly when the steering head is in transport position, without disturbing the position of such head, which facilitates guiding and steering the truck.

So far as I am aware it is new to provide means for checking the descent of the steering wheel end of the base of a portable elevator of the character described, and the claims hereinafter made should, therefore, be construed generically except in so far as they are directed to specific features of the construction shown and described. Furthermore, my invention is not limited to a base provided with non-rotatable supports such as the standards shown, as in some cases wheels are used in lieu of such standards. Also, while I prefer to equip the steering head with two wheels my invention contemplates an arrangement employing a single steering wheel.

The improvements which form the subject-matter of this application are not concerned with the elevating means carried by the base for lifting the load above the base and they may be applied to other forms of lift trucks other than those generally known as portable elevators. It should be understood, therefore, that the term portable elevator as used in the claims is intended to comprehend any form of lift truck to which my improvements are applicable.

What I claim as my invention and desire to secure by Letters Patent, is—

1. A portable elevator comprising a base, wheels supporting one end portion thereof, means carried by the base and adapted to bear on the floor to support the other end portion of said base, a steering axle, steering wheels mounted on said steering axle, a head on said steering axle, a cylinder connected with said head, a collar movable on said cylinder to engage said base, a cylinder on said base telescoping with said first cylinder, a piston operating in said first cylinder to check the descent of the base during the lowering operation, and means operable to move said collar vertically.

2. A portable elevator comprising a base, wheels supporting one end portion thereof, means carried by the base and adapted to bear on the floor to support the other end portion of said base, a steering axle, steering wheels mounted on said steering axle, a head on said steering axle, a cylinder connected with said head, a collar movable on said cylinder to engage said base, a cylinder on said base telescoping with said first cylinder, a piston operating in said first cylinder to check the descent of the base during the lowering operation, toggle mechanism connected with said steering axle and with the collar to move said collar vertically, and mean for actuating said toggle mechanism.

3. A portable elevator comprising a base, wheels supporting one end portion thereof, means carried by the base and adapted to bear on the floor to support the other end portion of said base, a steering axle, steering wheels mounted on said steering axle, a head on said steering axle, a cylinder connected with said head, a collar movable on said cylinder to engage said base, a cylinder on said base telescoping with said first cylinder, a piston connected with the base and operating in said first cylinder to check the descent of the base during the lowering operation, a yoke pivotally mounted on said steering axle, links pivotally mounted on the steering axle and adapted to be actuated by said yoke, and links connected at one end with said collar and at the other end with said first mentioned links to form toggles.

4. A portable elevator comprising a base, wheels supporting one end portion thereof, means carried by the base and adapted to bear on the floor to support the other end portion of said base, a steering axle, steering wheels mounted on said steering axle, a head on said steering axle, a cylinder connected with said head, a collar mounted on said cylinder to rotate therewith and movable longitudinally thereof to engage said base, a cylinder on said base telescoping with said first cylinder, a piston connected with the base and operating in said first cylinder to check the descent of the base during the lowering operation, a yoke pivotally mounted on said steering axle, links pivotally mounted on the steering axle and adapted to be actuated by said yoke, and links connected at one end with said collar and at the other end with said first mentioned links to form toggles.

5. A portable elevator comprising a base, wheels supporting one end portion thereof, means carried by the base and adapted to bear on the floor to support the other end portion of said base, a steering axle, steering wheels mounted on said steering axle, a head on said steering axle, a cylinder connected with said head, a collar movable on said cylinder to engage said base, a cylinder on said base telescoping with said first cylinder, a piston connected with the base and operating in said first cylinder to check the descent of the base during the lowering operation, a yoke pivotally mounted on said steering axle, links pivotally mounted on the steering axle and adapted to be actuated by said yoke, links connected at one end with said collar and at the other end with said first mentioned links to form toggles, and means mounted on said axle and engaging said collar to cause said collar to turn with the axle in steering, while permitting relative vertical movement thereof.

6. An elevating truck comprising a base, wheels supporting one end portion thereof, a wheel supported steering head supporting the opposite end portion of the base, said steering head being movable vertically relatively to the base to lift or lower the adjacent end portion thereof, a steering handle mounted on said head and movable therewith relatively to the base, means interposed between said steering head and the base and operable by said handle to move said steering head vertically relatively to the base, and means coaxial with the steering axis of said head for checking the descent of the base during the lowering operation.

7. An elevating truck comprising a base, wheels supporting one end portion thereof, a wheel supported steering head supporting the opposite end portion of the base, said steering head being movable vertically relatively to the base to lift or lower the adjacent end portion thereof, a hydraulic check comprising a vertical cylinder coaxial with the steering axis of the steering head and connected therewith, a cylinder telescoped rotatably on said cylinder and mounted on the base, a piston mounted on the base and operating in said first cylinder to check the descent of the base during the lowering operation, lifting means mounted on the steering head below said cylinders and operable to move the steering head vertically relatively to the base, and a steering handle mounted on the steering head to move vertically therewith and operable to actuate said lifting means.

8. An elevating truck comprising a base, wheels supporting one end portion thereof, a wheel supported steering head supporting the opposite end portion of the base, a cylinder connected with said steering head coaxially with the steering axis thereof, a collar movable vertically on said cylinder to raise or lower the base, a cylinder on the base telescoping with said first cylinder, a piston connected with the base and operating in said first cylinder to check the descent of the base during the lowering operation, and means operable to move said collar vertically.

9. An elevating truck comprising a base, wheels supporting one end portion thereof, a wheel supported steering head supporting the opposite end portion of the base, said steering head being movable vertically relatively to the base, a cylinder connected with said steering head, a collar movable vertically on said cylinder to raise or lower the base, a cylinder on the base telescoping with said first cylinder, and means operable to move said collar vertically.

10. An elevating truck comprising a base, wheels supporting one end portion thereof, a wheel supported steering head supporting the opposite end portion of the base, said steering head being movable vertically relatively to the base, a cylinder connected with said steering head, a collar connected to rotate with the steering head and movable vertically on said cylinder to raise or lower the base, a cylinder on the base telescoping with said first cylinder, and toggle mechanism interposed between the steering head and said collar operable to move said collar vertically.

11. An elevating truck comprising a base, wheels supporting one end portion thereof, a wheel supported steering head supporting the opposite end portion of the base, said steering head being movable vertically relatively to the base, a cylinder connected with said steering head, a collar movable vertically on said cylinder to raise or lower the base, a cylinder on the base telescoping with said first cylinder, and means mounted on the steering head operable to move said collar vertically.

12. An elevating truck comprising a base, wheels supporting one end portion thereof, a wheel supported steering head supporting the opposite end portion of the base, said steering head being movable vertically relatively to the base, a cylinder connected with said steering head, a collar movable vertically on said cylinder to raise or lower the base, a cylinder on the base telescoping with said first cylinder, and toggle mechanism interposed between the steering head and said collar operable to move said collar vertically.

13. An elevating truck comprising a base, wheels supporting one end portion thereof, a wheel supported steering head supporting the opposite end portion of the base, said steering head being movable vertically relatively to the base to lift or lower the adjacent end portion thereof, toggle mechanism pivotally mounted on said steering head concentrically with the steering wheel and operable to move the steering head vertically relatively to the base, a steering handle operable to actuate said toggle mechanism, and means acting coaxially with said steering head to check the descent of said base.

14. An elevating truck comprising a base, wheels supporting one end portion thereof, a wheel supported steering head supporting the opposite end portion of the base, said steering head being movable vertically relatively to the base to lift or lower the adjacent end portion thereof, means pivoting said steering head to the base, lifting means mounted on the steering head concentrically with the steering wheel and operable to move the steering head vertically relatively to the base, and a steering handle pivotally mounted on the steering head concentrically with the steering wheel and operable to actuate said lifting means to move the steering head vertically relatively to the base.

15. An elevating truck comprising a base, wheels supporting one end portion thereof, a wheel supported steering head supporting the opposite end portion of the base, said steering head being movable vertically relatively to the base to lift or lower the adjacent end portion thereof, toggle mechanism pivotally mounted on said steering head concentrically with the steering wheel and operable to move the steering head vertically relatively to the base, and a steering handle pivotally mounted on the steering head concentrically with the steering wheel and operable to actuate said toggle mechanism.

16. An elevationg truck comprising a base, wheels supporting one end portion thereof, a wheel supported steering head supporting the opposite end portion of the base, said steering head being movable vertically relatively to the base to lift or lower the adjacent end portion thereof, toggle mechanism pivotally mounted on said steering head concentrically with the steering wheel and operable to move the steering head vertically relatively to the base, and a steering handle pivotally mounted on the steering head concentrically with the steering wheel and operable to actuate said toggle mechanism and having a limited range of movement independently thereof.

17. An elevating truck comprising a base, wheels supporting one end portion thereof, a wheel supported steering head supporting the opposite end portion of the base, a supporting member connected with said steering head coaxially with the steering axis thereof, a second supporting member on the base telescoping with said first supporting member, lifting means mounted on the steering head including a member encircling the first mentioned supporting member, said lifting means being operable to apply upward thrust to the base around the lower part of said first-mentioned member, and a steering handle operable to actuate said lifting means.

18. An elevating truck comprising a base, wheels supporting one end portion thereof, a wheel supported steering head supporting the opposite end portion of the base, a supporting member connected with said steering head coaxially with the steering axis thereof, a second supporting member on the base telescoping with said first supporting member, toggle mechanism mounted on the steering head including a member surrounding the first supporting member and operable to apply upward thrust to the lower part of the base around said first-mentioned supporting member, and a steering handle operable to actuate said toggle mechanism.

19. An elevating truck comprising a base, wheels supporting one end portion thereof, a wheel supported steering head supporting the opposite end portion of the base, said steering head being movable vertically relatively to the base, a cylinder connected with said steering head, a collar movable vertically on said said cylinder to raise or lower the base, a cylinder on the base telescoping with said first cylinder, toggle mechanism pivotally mounted on the steering head concentrically with the steering wheel and connected with said collar to move the same vertically, and a steering handle for actuating said toggle mechanism.

20. An elevating truck comprising a base, wheels supporting one end portion thereof, a wheel supported steering head supporting the opposite end portion of the base, said steering head being movable vertically relatively to the base, a cylinder connected with said steering head, a collar movable vertically on said cylinder to raise or lower the base, a cylinder on the base telescoping with said first cylinder, toggle mechanism pivotally mounted on the steering head concentrically with the steering wheel and connected with said collar to move the same vertically, and a steering handle for actuating said toggle mechanism, said handle being pivotally mounted on the steering head and concentrically with the steering wheel and having a limited range of movement independently of said toggle mechanism.

21. An elevating truck comprising a base, wheels supporting one end portion thereof, a wheel supported steering head supporting the opposite end portion of the base, said steering head being movable vertically relatively to the base, a cylinder connected with said steering head to move vertically therewith, said cylinder being open at its upper end, a cylinder on the base enclosing and telescoping with said first cylinder, a piston connected with the base and operating in said first cylinder to check the descent of the base during the lowering operation, lifting means mounted on the steering head and operable to move the same vertically relatively to the base, and a steering handle mounted on the steering head to move therewith and operable to actuate said lifting means.

22. An elevating truck comprising a base, wheels supporting one end portion thereof, a wheel supported steering head supporting the opposite end portion of the base, said steering head being movable vertically relatively to the base, a cylinder connected with said steering head to move vertically therewith, said cylinder being open at its upper end, a cylinder on the base telescoping with said first cylinder, a piston connected with the base and operating in said first cylinder to check the descent of the base during the lowering operation, toggle mechanism pivotally mounted on the steering head coaxially with the steering wheel and operable to apply upward thrust to the base around said first cylinder, and to lock the steering head in transport position, and a steering handle pivotally mounted on the steering head concentrically with the steering wheel and operable to actuate said toggle mechanism.

23. An elevating truck comprising a base, wheels supporting one end portion thereof, a wheel supported steering head supporting the opposite end portion of the base, a cylinder connected with said steering head, coaxially with the steering axis thereof, a cylinder on the base telescoping with said first cylinder, lifting means mounted on the steering head and operable to apply upward thrust to the base around the said first-mentioned cylinder, a steering handle operable to actuate said lifting means, and means on the interior of said cylinders to check the descent of the base.

24. An elevating truck comprising a base, wheels supporting one end portion thereof, a wheel supported steering head supporting the opposite end portion of the base, a cylinder connected with said steering head coaxially with the steering axis thereof, a cylinder on the base telescoping with said first cylinder, lifting means mounted on the steering head and operable to apply upward thrust to the base around said first-mentioned cylinder, a steering handle operable to actuate said lifting means, and means cooperating with the interior of said first mentioned cylinder to check the descent of the base.

25. An elevating truck comprising a base, wheels supporting one end portion thereof, a wheel supported steering head supporting the opposite end portion of the base, said steering head being movable vertically relatively to the base, a steering handle mounted on the steering head, means pivotally mounted on the steering head coaxially with the steering wheel and adapted to be actuated by the operation of said handle to move the steering head vertically relatively to the base, said means including a member adapted to contact with the base, and means connecting the steering head with said member against relative rotation.

26. An elevating truck comprising a base, wheels supporting one end portion thereof, a wheel supported steering head supporting the opposite end portion of the base, said steering head being movable vertically relatively to the base, a steering handle mounted on the steering head, toggle mechanism pivotally mounted on the steering head coaxially with the steering wheel and adapted to be actuated by the operation of the handle to move the steering head vertically relatively to the base, said toggle mechanism including pivoted links and an engaging member adapted to contact with the base, and means extending between the steering head and said member to transmit steering stresses from the head to the member.

27. An elevating truck comprising a base, wheels supporting one end portion thereof, a wheel supported steering head supporting the opposite end portion of the base, said head and base being relatively movable vertically, a steering handle mounted on the steering head, lifting means including upper and lower links pivoted together and pivotally connected with the head and the base and actuated by said steering handle for raising the base, and means for causing said pivoted links to turn with the steering head, said means bridging the pivots of said links for transmitting torsional stresses, due to the steering movement, from the steering head to the upper link connection with the base and thereby preventing the steering stresses from being transmitted to the pivoted links.

ARTHUR M. BARRETT.